United States Patent [19]
Sibson

[11] Patent Number: 6,050,584
[45] Date of Patent: Apr. 18, 2000

[54] BICYCLE PLACING RIDER IN SUBSTANTIALLY SEMI-PRONE RIDING POSITION

[76] Inventor: Brian Sibson, 262 Euclid Ave., Daytona Beach, Fla. 32118

[21] Appl. No.: 09/056,483

[22] Filed: Apr. 7, 1998

[51] Int. Cl.[7] .................................................. B62M 1/04
[52] U.S. Cl. .................... 280/283; 280/304.4; 280/288.4
[58] Field of Search .............................. 280/304.3, 304.4, 280/288.1, 288.4, 275, 283, 281.1

[56] References Cited

U.S. PATENT DOCUMENTS

| | | | |
|---|---|---|---|
| D. 251,185 | 2/1979 | Cummings | D12/11 |
| D. 313,381 | 1/1991 | Moeller | D12/111 |
| D. 357,889 | 5/1995 | Jones | D12/111 |
| 559,244 | 4/1896 | Williams | 280/288.4 |
| 565,880 | 8/1896 | Cleveland . | |
| 578,027 | 3/1897 | Rogers | 280/288.4 |
| 588,881 | 8/1897 | Roberts . | |
| 603,545 | 5/1898 | Williams . | |
| 620,688 | 3/1899 | Wood . | |
| 626,852 | 6/1899 | Bemis | 280/288.4 |
| 846,033 | 3/1907 | Kidney . | |
| 3,329,444 | 7/1967 | Lidov | 280/252 |
| 4,248,448 | 2/1981 | Dmitrowsky . | |
| 4,411,443 | 10/1983 | Pollard | 280/288.1 |
| 4,647,060 | 3/1987 | Tomkinson . | |
| 4,838,568 | 6/1989 | Arroyo . | |
| 4,976,658 | 12/1990 | Hood | 474/49 |
| 4,978,167 | 12/1990 | Harvey . | |
| 5,240,268 | 8/1993 | Allsop et al. . | |
| 5,326,122 | 7/1994 | Duffy . | |
| 5,383,677 | 1/1995 | Thomas et al. | 280/288.4 |
| 5,419,619 | 5/1995 | Lew | 301/5.1 |
| 5,490,719 | 2/1996 | Lew | 301/5.1 |
| 5,498,014 | 3/1996 | Kulhawik et al. . | |
| 5,611,557 | 3/1997 | Farris et al. . | |
| 5,632,702 | 5/1997 | Mills . | |
| 5,915,710 | 6/1999 | Miller | 280/252 |

Primary Examiner—Kevin Hurley
Attorney, Agent, or Firm—Allen, Dyer, Doppelt, Milbrath & Gilchrist, P.A.

[57] ABSTRACT

A bicycle in accordance with the present invention has a main frame with front and rear frame portions. A handlebar and front wheel is mounted on the front frame portion. A rear wheel is mounted on the rear frame portion. A body support member is pivotally connected to the main frame. The body support member further comprises a seat that supports a rider and a torso engaging member for engaging the torso of a rider to place the rider in a substantially prone riding position. Shock absorbing means is pivotally connected between the main frame and body support member for supporting the body support member and absorbing shocks upon the torso and seat of a rider.

76 Claims, 9 Drawing Sheets

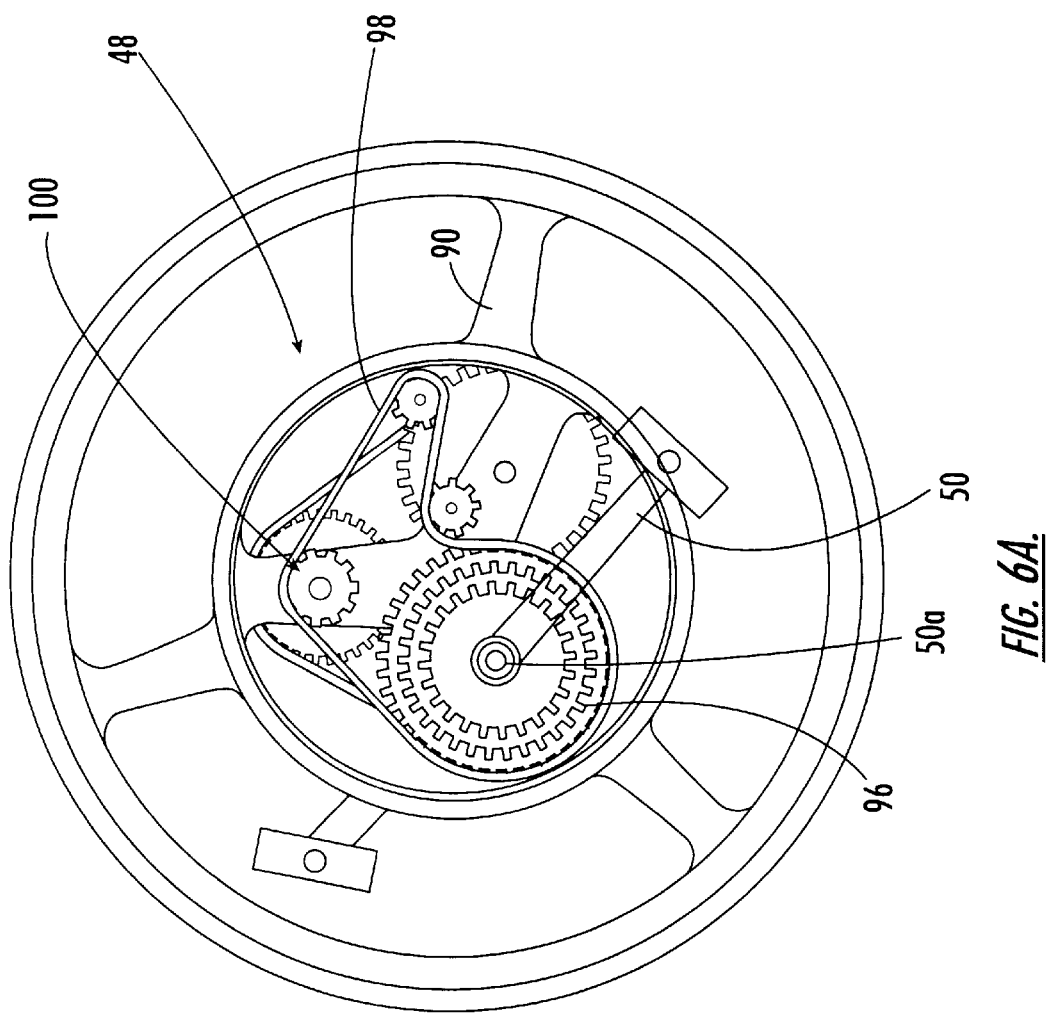

BICYCLE PLACING RIDER IN SUBSTANTIALLY SEMI-PRONE RIDING POSITION

FIELD OF THE INVENTION

This invention relates to the field of bicycles, and more particularly, to a bicycle where the rider is placed in a substantially semi-prone riding position.

BACKGROUND OF THE INVENTION

Bicycling has become an ever more popular sport in recent years. Because of the ever increasing demand for different bicycle designs that meet different standards for pleasure bicycling or strenuous cross-country bicycling, different bicycle designs are becoming more common place. Some of these designs are adapted for riders with particular handicaps, as well as for increased rider comfort, increased speed such as used for racing bicycles, and for increasing endurance in cross-country bicycling.

Some of these bicycles have been designed for placing a rider in a semi-prone position on the bicycle to decrease wind resistance, place the rider in a position for greater comfort, more fully utilize the large muscle groups of the legs, and in addition, lower the center of gravity. For example, U.S. Pat. No. 4,248,448 to Dmitrowsky discloses a seat having an elongated front that engages the stomach of a rider for placing the rider in a semi-prone position. The pedals are located to the rear of the rear wheel to allow use of the larger muscle groups of the legs. The seat is locked in a desired position before use to accommodate different size riders. However, the '448 Dmitrowsky patent does not disclose any structure for supporting the torso and shoulders and is not advantageous for rough rides because the seat (or saddle) is locked in a predetermined position and is not freely pivotal.

Some U.S. patents disclose other bicycle designs for placing a rider in a semi-prone position, or for enhancing use of the muscle groups in the legs. These patents include U.S. Pat. No. 4,647,060 to Tomkinson, U.S. Pat. No. 846,033 to Kidney, Design Pat. No. 357,889 to Jones, and U.S. Pat. No. 4,838,568 to Arroyo. U.S. Pat. No. 5,326,122 to Duffy discloses the broad concept of a bicycle including a member in which the chest of a rider is positioned. This chest support member is connected to a handlebar stem.

U.S. Pat. No. 6,034,545 to Williams discloses a support member positioned under the shoulders of a rider and U.S. Pat. No. 5,888,881 to Robert and U.S. Pat. No. 565,880 to Cleveland each disclose a bicycle including a shoulder brace or support. However, the prior art does not disclose a structure where a seat and torso engaging member, such as for engaging the shoulders, are both positioned on one member separate from the main frame to enhance the rider's comfort and also place the rider in a semi-prone position, while also allowing greater use of the muscles contained in the legs.

SUMMARY OF THE INVENTION

It is therefore an object of the present invention to provide a bicycle that allows a rider to be placed in a semi-prone position using a structure where the seat and torso engaging member are supported on one pivotally mounted structure separate from a main frame.

It is still another object of the present invention to provide a bicycle that allows a rider to be placed in a semi-prone riding position and which absorbs shocks upon the torso and seat of a rider.

It is still another object of the present invention to provide a bicycle that allows a rider to be placed in a substantially semi-prone riding position, and which absorbs shocks upon the torso and seat of a rider, while also allowing enhanced use of the muscle groups in the legs.

The present invention now provides a bicycle to allow the rider to be placed in a substantially semi-prone riding position. A body support member is pivotally connected to the main frame and supports both a seat and a torso engaging member that engages with the torso (e.g., the shoulders) of a rider to place the rider in a substantially semi-prone riding position. Through appropriate shock absorbers placed between the main frame and the body support member, the rider can have a smooth ride because the shock absorbers not only support the body support member, but absorb shocks upon the torso, shoulders and seat (buttocks) of a rider. The bicycle of the present invention also provides a lower center of gravity that enhances stability of the bicycle during rough and fast rides.

In accordance with the present invention, the bicycle comprises a main frame including front and rear frame portions. The handlebar and front wheel are mounted on the front frame portion. A rear wheel is mounted on the rear frame portion. A body support member is pivotally connected to the main frame. The body support member further comprises a seat that supports a rider, and a torso engaging member for engaging the torso (e.g., the shoulders) of a rider to place the rider in a substantially prone riding position.

The bicycle further comprises shock absorbing means pivotally connected between the main frame and the body support member for supporting the body support member and absorbing shocks upon the torso and seat of a rider. The shock absorbing means can comprise a shock absorber having an adjustable length for varying the angle between the main frame and the body support member. The shock absorbing means can comprise a front shock absorber mounted between the front frame portion and the body support member, and a rear shock absorber mounted between the front frame portion and the body support member.

In one aspect of the present invention, the body engaging member is configured for engaging the front shoulders of a rider. The main frame also comprises upper and lower frame members that merge at the rear frame portion. The body support member can comprise a longitudinally extending support member extending forward of the main frame, and an upstanding seat support in which the seat is positioned. The body support member can further comprise a front extendible (e.g., slidable) tube in which the torso engaging member is mounted for allowing extension of the torso engaging member relative to the main frame when the tube is extended or outwardly slid.

The bicycle further comprises a head tube having a support tube extending through the head tube and having upper and lower ends for supporting respectively the front wheel on the lower end of the support tube and the handlebar on the upper end. In still another aspect of the present invention, the front wheel comprises a hubless front wheel and the lower end of the support tube further comprises an assembly for mounting the hubless front wheel. In another aspect of the present invention, the front wheel can comprise a front axle and wheel, and the lower end of the support tube further can comprise a front fork for supporting the front axle and wheel. The upper end of the support tube further comprises a handlebar support stem for supporting the handlebar. The handlebar support stem can further comprise means for supporting the handlebar in a forward and downward direction from the handlebar support stem.

In still another aspect of the present invention, the main frame further comprises pivotal mounting means for pivotally mounting the body support member adjacent to the rear portion of the main frame. The rear wheel comprises a hubless wheel and the rear frame portion further comprises means for mounting the hubless wheel.

The main frame and body support member are preferably formed of carbon fiber to form a bicycle frame that is lightweight in structure, while also providing for high strength that can withstand the extensive shocks and material fatigue imparted during stressful riding conditions.

To make greater use of the muscle groups in the legs, the rear frame portion of the main frame includes a pedal crank mounted rearward of where a seat is to be mounted on the body support member. A transmission is mounted on the rear portion of the main frame and coupled between the pedal crank and the rear wheel. The transmission can further comprise a continuous variable speed transmission in one embodiment and can comprise a multispeed gear assembly having a transfer gear assembly in still another embodiment.

In still another aspect of the present invention, the bicycle comprises a main frame having front and rear frame portions and a handlebar and front wheel mounted on the front frame portion. A rear wheel is mounted on the rear frame portion. A body support member is pivotally connected to the main frame. The body support member comprises a substantially U-shaped cradle having a lower end pivotally connected to the main frame and front and rear upstanding ends. A seat is mounted on the rear upstanding end and supports a rider. A torso engaging member is mounted on the front upstanding end for engaging the torso of a rider and placing the rider in a substantially semi-prone riding position.

In a method aspect of the present invention, a method of operating a bicycle comprises the steps of straddling the main frame of a bicycle that comprises front and rear frame portions and a body support member pivotally connected to the main frame such that the seat of the rider engages a seat on the rear portion of the body support member. The torso of the rider engages a torso engaging member positioned on the front portion of the body support member to place the rider in a substantially semi-prone riding position. The method further comprises the step of biasing the body support member by a shock absorber mounted between the main frame and the body support member. The method further comprises the steps of adjusting the length of the shock absorber for varying the angle between the main frame and the body support member. The method can further comprise the steps of adjusting the position of the torso engaging member relative to the body support member.

BRIEF DESCRIPTION OF THE DRAWINGS

Other objects, features and advantages of the present invention will become apparent from the detailed description of the invention which follows, when considered in light of the accompanying drawings in which:

FIG. 6A is an enlarged left side elevation view showing the transfer gear assembly used in the multispeed transmission of the bicycle shown in FIGS. 4 and 5.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now allows a seat and body support member, such as for supporting the shoulders and torso of a semi-prone rider, to be mounted on one body support member, which, in turn, is pivotally connected to the main frame. A shock absorbing means can be pivotally connected between the main frame and the body support member for supporting the body support member and absorbing shocks upon the torso and seat of a rider. Also, greater use can be made of the muscle groups in the legs by having a pedal crank mounted to the rear of where a seat is to be mounted on the body support member and having a transmission connected between the pedal crank and rear wheel.

Figure 1:
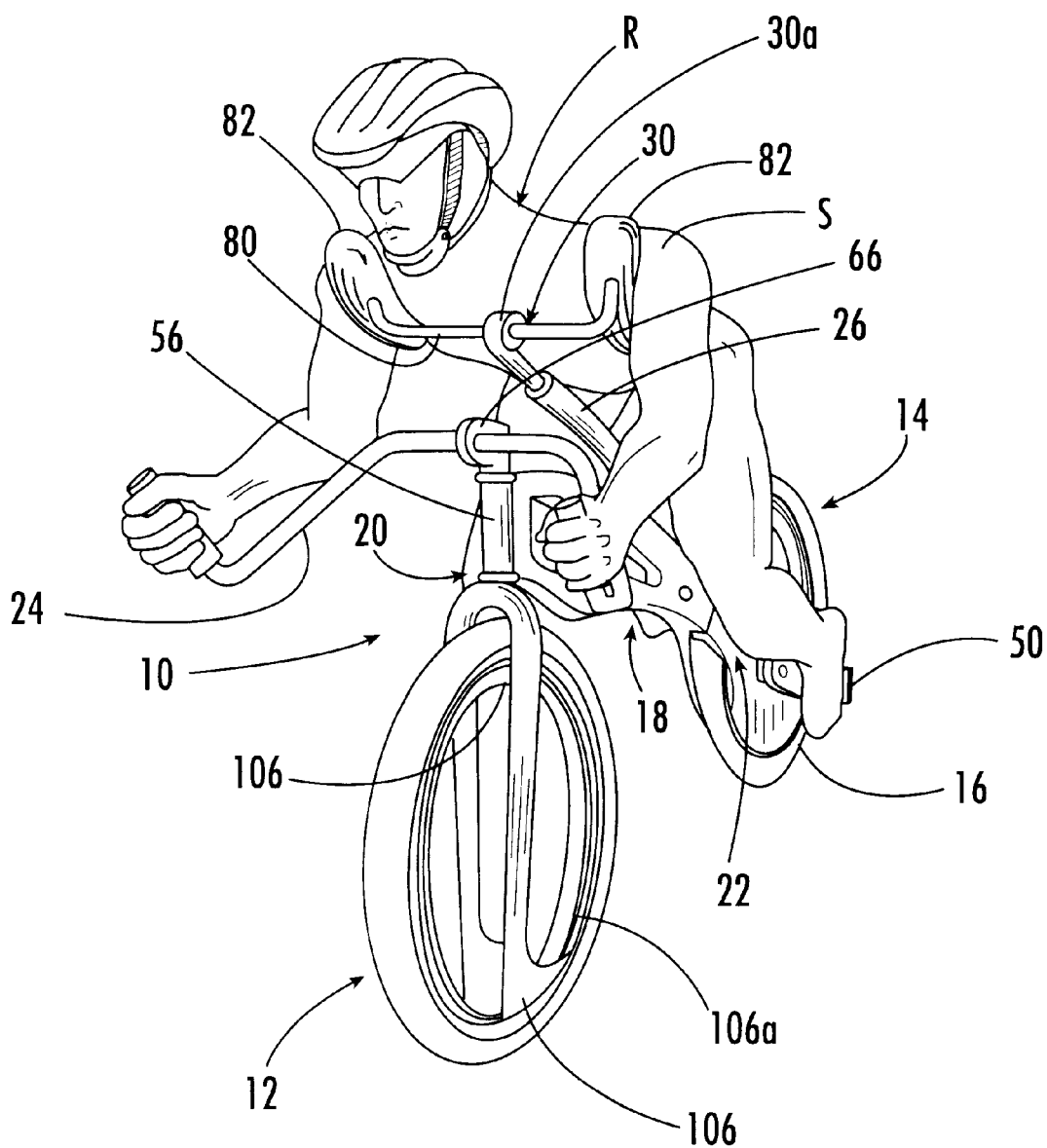
FIG. 1 is a perspective view of the bicycle of the present invention showing a rider positioned in a semi-prone position with the rider's shoulders engaging the shoulder pads of the torso engaging member.
Figure 9:
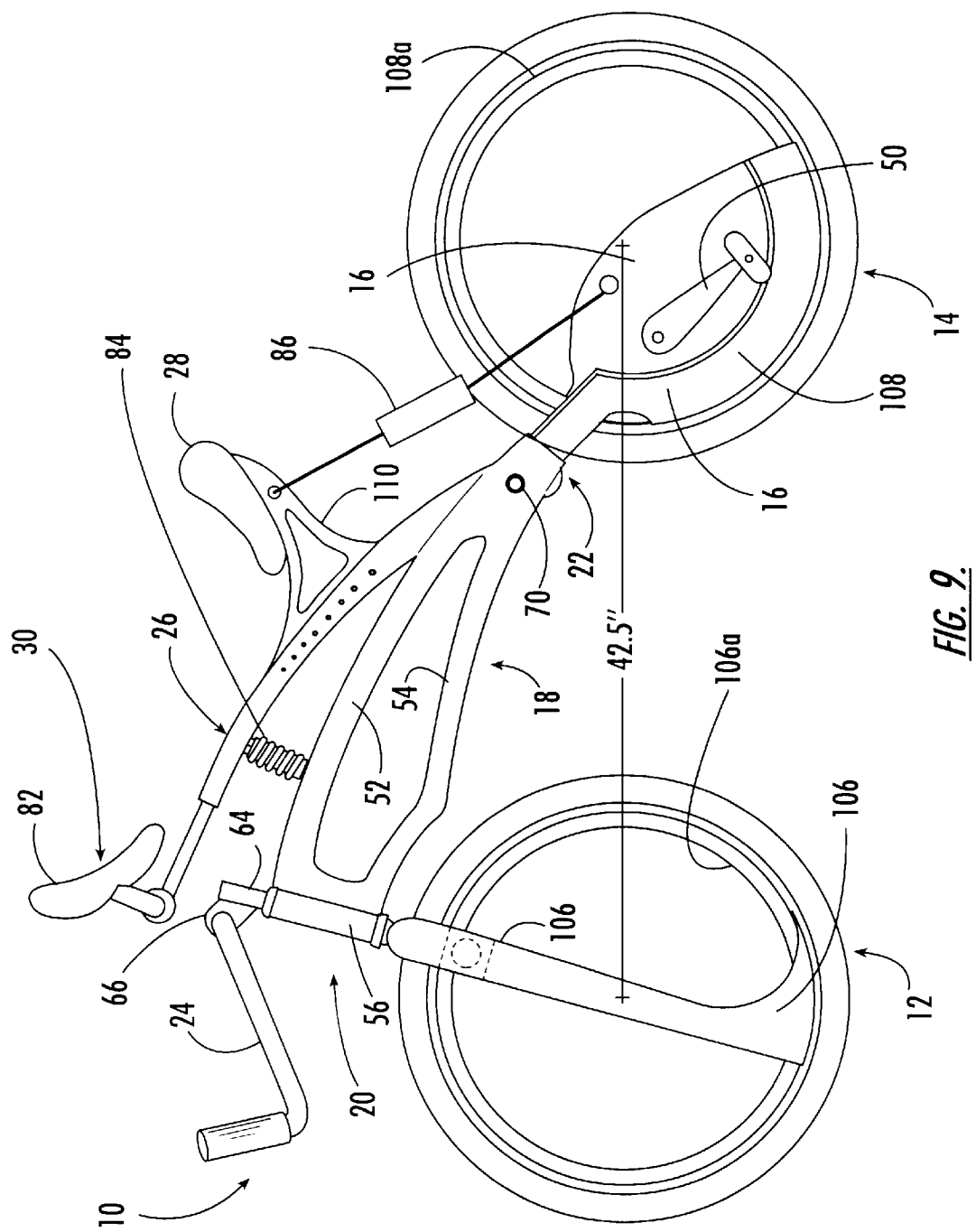
FIG. 9 is a side elevation view showing another embodiment of the bicycle of the present invention using a continuous variable transmission and hubless wheels as shown in FIG. 1.

FIG. 1 is a perspective view of a bicycle 10 (also shown in side elevation in FIG. 9), in accordance with one embodiment of the present invention, having a front and rear wheel 12,14, and a continuous variable transmission 16. As illustrated, the bicycle 10 includes a main frame 18 having front and rear frame portions 20,22. A handlebar 24 and the front wheel 12 are mounted on the front frame portion 20. The rear wheel 14 is mounted on the rear frame portion 22. A body support member 26 is pivotally connected to the main frame 18. The body support member 26 includes a seat 28 (FIG. 9), which supports a rider, and a torso engaging member 30 for engaging the torso, and in the illustrated embodiment, the shoulders S of a rider R to place the rider in a substantially semi-prone riding position (shown by the line configuration R' in FIGS. 2, 4 and 5).

Figure 2:
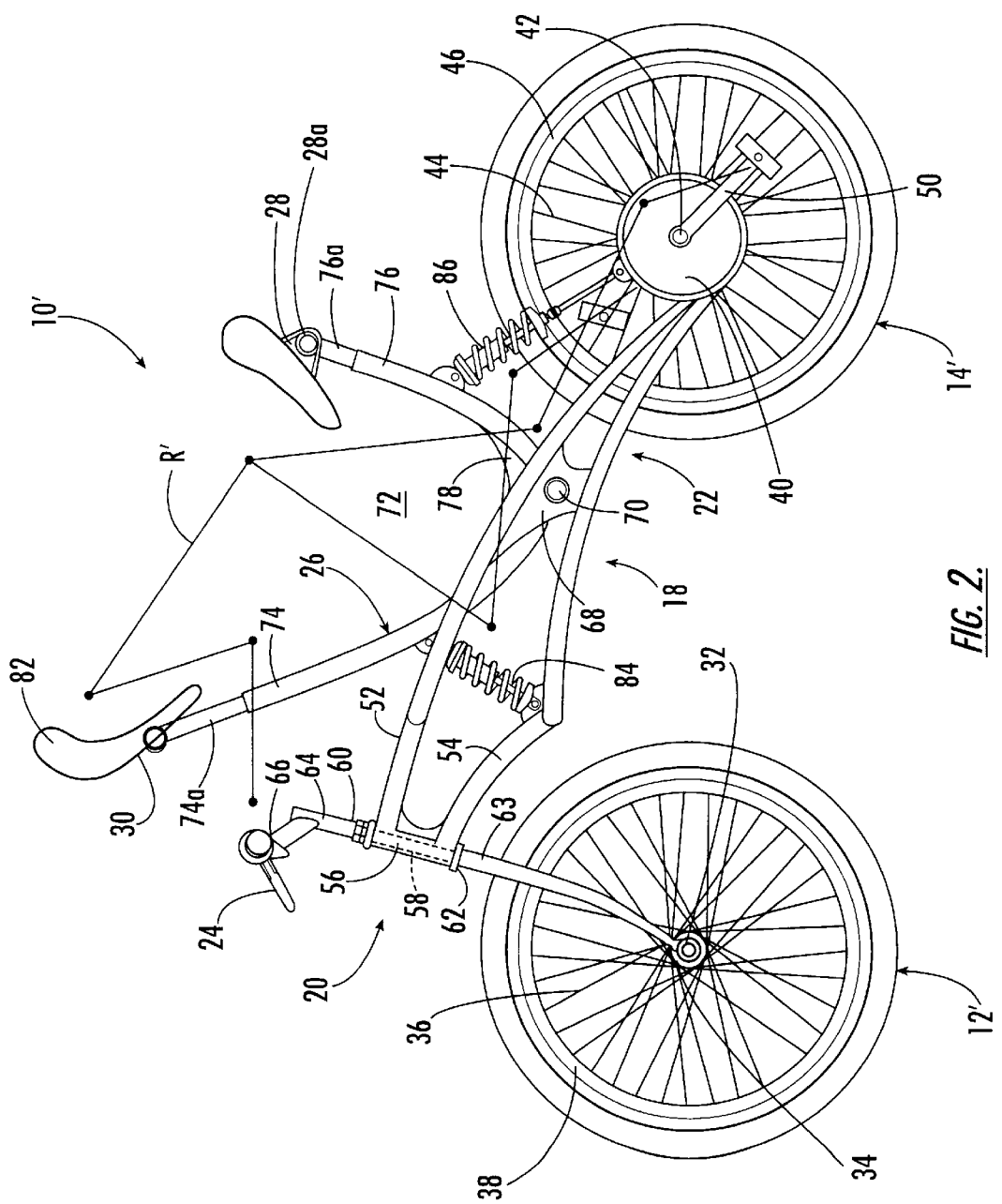
FIG. 2 is an enlarged left side elevation view of another bicycle of the present invention having a U-shaped cradle that supports the seat and torso engaging member.
Figure 3:
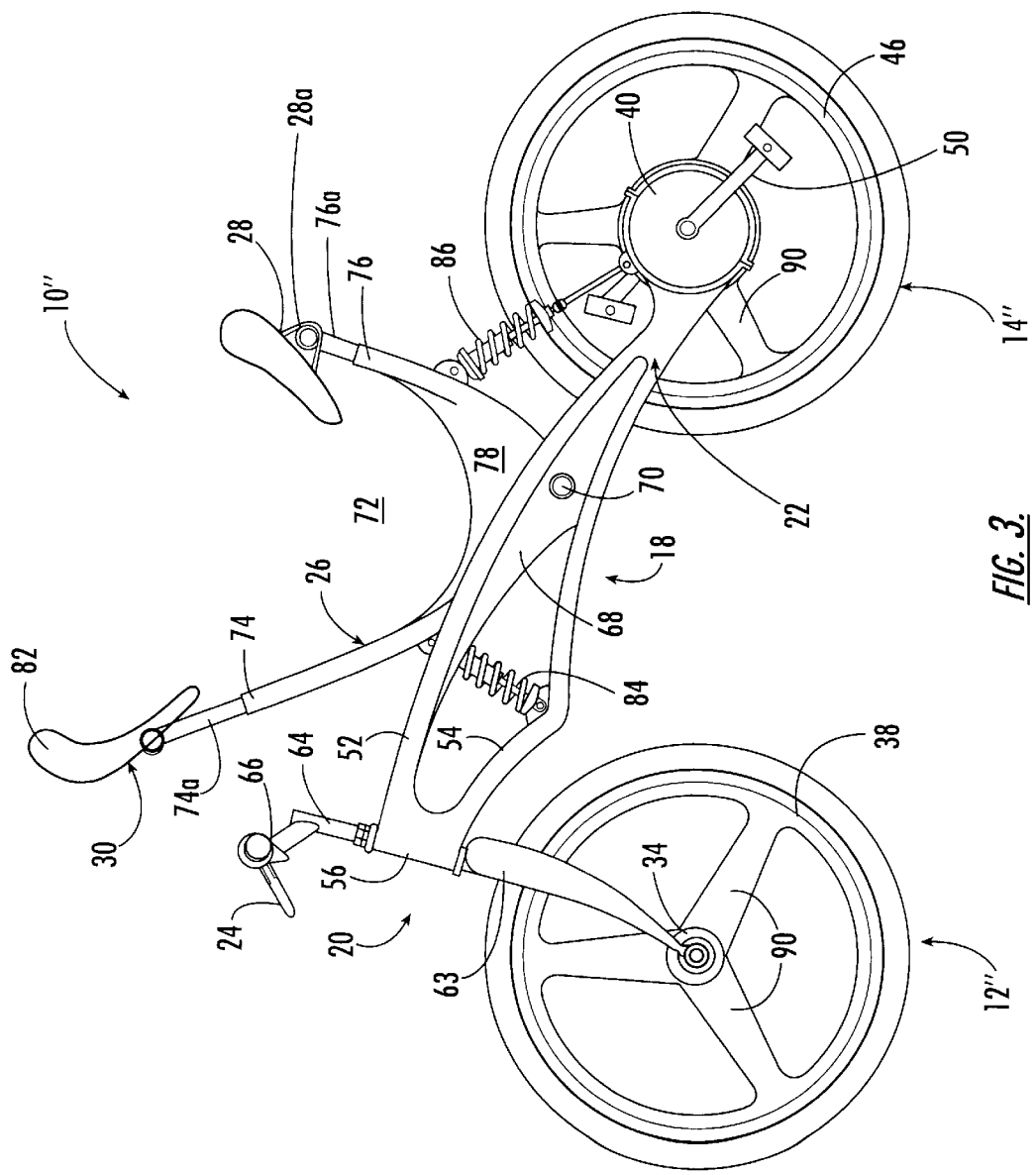
FIG. 3 is an enlarged left side elevation view of another bicycle similar to that shown in FIG. 2, using integrally formed wheels.
Figure 6B:
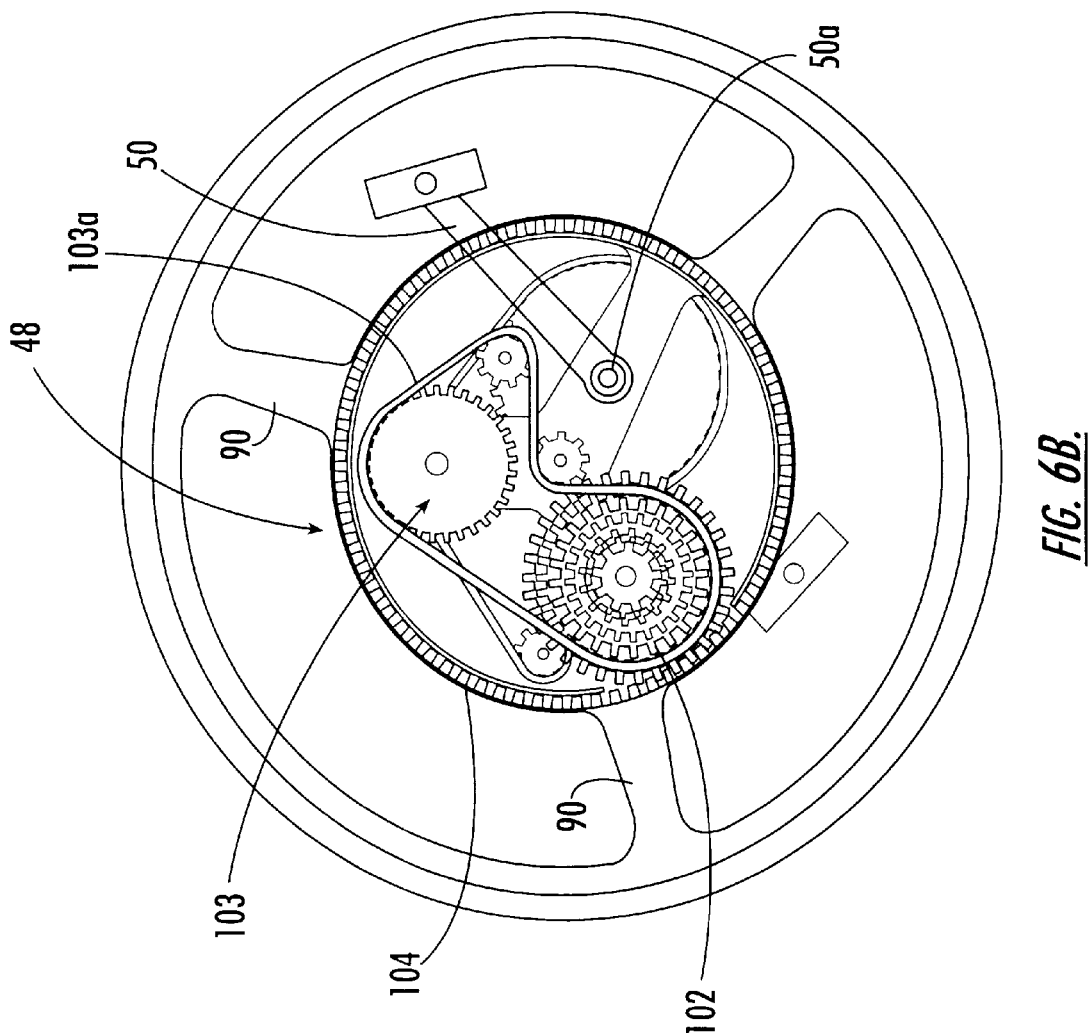
FIG. 6B is an enlarged right side elevation view of the transfer gear assembly used in the multispeed transmission shown in FIG. 6A.
Figure 7:
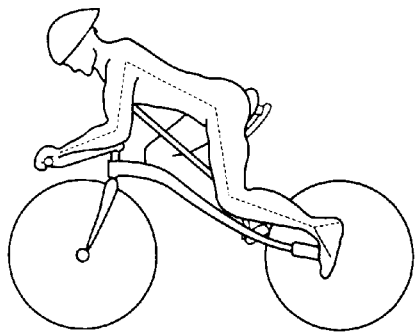
FIG. 7 is a schematic view of the bicycle of the present invention showing a rider positioned in a semi-prone position on the bicycle with a pedal crank positioned at the center hub of the rear wheel as in FIG. 3.

Referring now to FIG. 2, there is illustrated an enlarged left side elevation view of a bicycle 10' in accordance with another embodiment of the present invention using spoked front and rear wheels 12',14'. The front wheel 12' includes an axle 32 received in a hub 34 and spokes 36 interconnecting a rim 38. The rear wheel 14' includes a larger hub 40 received over an axle 42 and spokes 44 interconnecting the rim 46. A multispeed geared transmission 48 and pedal crank 50 interconnect the rear wheel 14' for driving the bicycle 10. FIGS. 2, 3 and 7 show a pedal crank positioned in the center portion of a rear wheel hub. A preferred embodiment with an offset pedal crank 50 is illustrated in FIGS. 4, 5, 6A and 6B.

As illustrated in FIG. 2, the main frame 18 is formed from respective upper and lower frame members 52,54 that merge at the rear frame portion 22. A head tube 56 is positioned at the front frame portion 20 and has a support tube 58 extending through the head tube 56 and mounted for rotational movement by conventional bearing assemblies (not shown). The support tube 58 includes respective upper and lower ends 60,62. The lower end 62 includes a front fork 63 for supporting the front axle 32 and hub 34 with interconnected spokes 36 and rim 38. The upper end 60 includes a handlebar support stem 64 and a receiving bracket 66 that receives the handlebar 24, which extends in a forward and downward direction from the handlebar support stem 64.

The rear frame portion 22 terminates in the rear hub 40 in which the multispeed transmission 48 is received, as will be explained in detail later. Adjacent the rear frame portion 22, a support bracket 68 is positioned between upper and lower frame members 52,54. The support bracket 68 includes a large pivot pin 70 on which the body support member 26 is pivotally connected at the main frame 18.

As shown in the embodiment of FIG. 2, the body support member 26 is formed as a substantially U-shaped cradle, indicated generally at 72, having its lower end pivotally connected to the main frame 18 via pin 70. The cradle 72 includes respective front and rear upstanding ends 74,76 for mounting respectively the torso engaging member 30 and the seat 28. As illustrated, the substantially U-shaped cradle 72 is formed from a tube that has been bent in a substantially U-shape, and includes a support flange 78 for maintaining the U configuration.

Each upstanding end 74,76 includes a respective slidable support tube 74a,76a, which is slidable out of the upstanding ends to change the position between the respective seat 28 and torso engaging member 30 with respect to the main frame 18. The seat 28 can be designed to standards as known to those skilled in the art and can be attached to the slidable tube 76a by a lockable bracket 28a that allows adjustable movement. The slidable tube 74a in the front upstanding end 74 can also include a receiving bracket 30a where a handlebar configured member 80 is received in the support bracket 30a and includes opposing ends, each having a shoulder rest 82 that engages the torso and front shoulders of a rider when positioned in a substantially semi-prone position (FIG. 1).

The main frame 18 and body support member 26 are preferably formed from a carbon fiber material to impart high strength to the main frame 18 and the body support member 26.

As shown in FIG. 2, shock absorbing means is pivotally connected between the main frame and body support member 26 for supporting the body support member and absorbing the imparted shock upon the torso (i.e., shoulders) and seat of a rider. In a preferred aspect of the present invention, the shock absorbing means comprises a front shock absorber 84 mounted between the front frame portion 20 and the body support member 26. A rear shock absorber 86 is mounted between the front frame portion and the body support member. It is thus seen that the shock absorbers not only support the U-shaped cradle 72, but also act as shocks to absorb the stress and strain imparted onto the U-shaped cradle and provide a damping effect to the rider.

FIG. 3 illustrates an embodiment of a bicycle 10" similar to that shown in FIG. 2, but showing spokeless wheels 12",14" that are formed as integral hubs 34,40 and rims 38,46, but having three supports 90 instead of spokes. The rear wheel includes a transmission as noted before.

Figure 4:
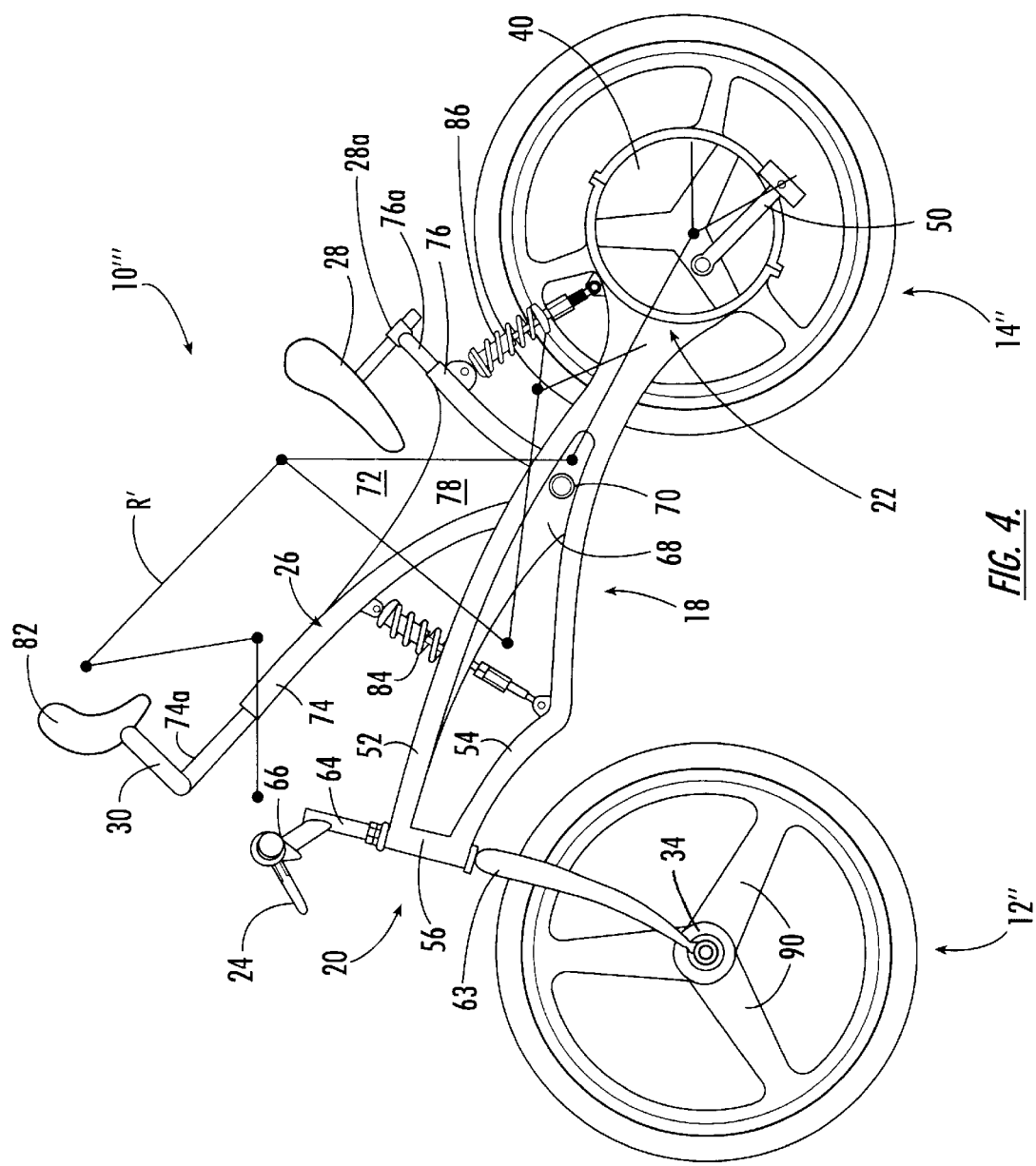
FIG. 4 is an enlarged left side elevation view of another bicycle using a multispeed transmission and a transfer gear assembly with offset pedal crank.
Figure 5:
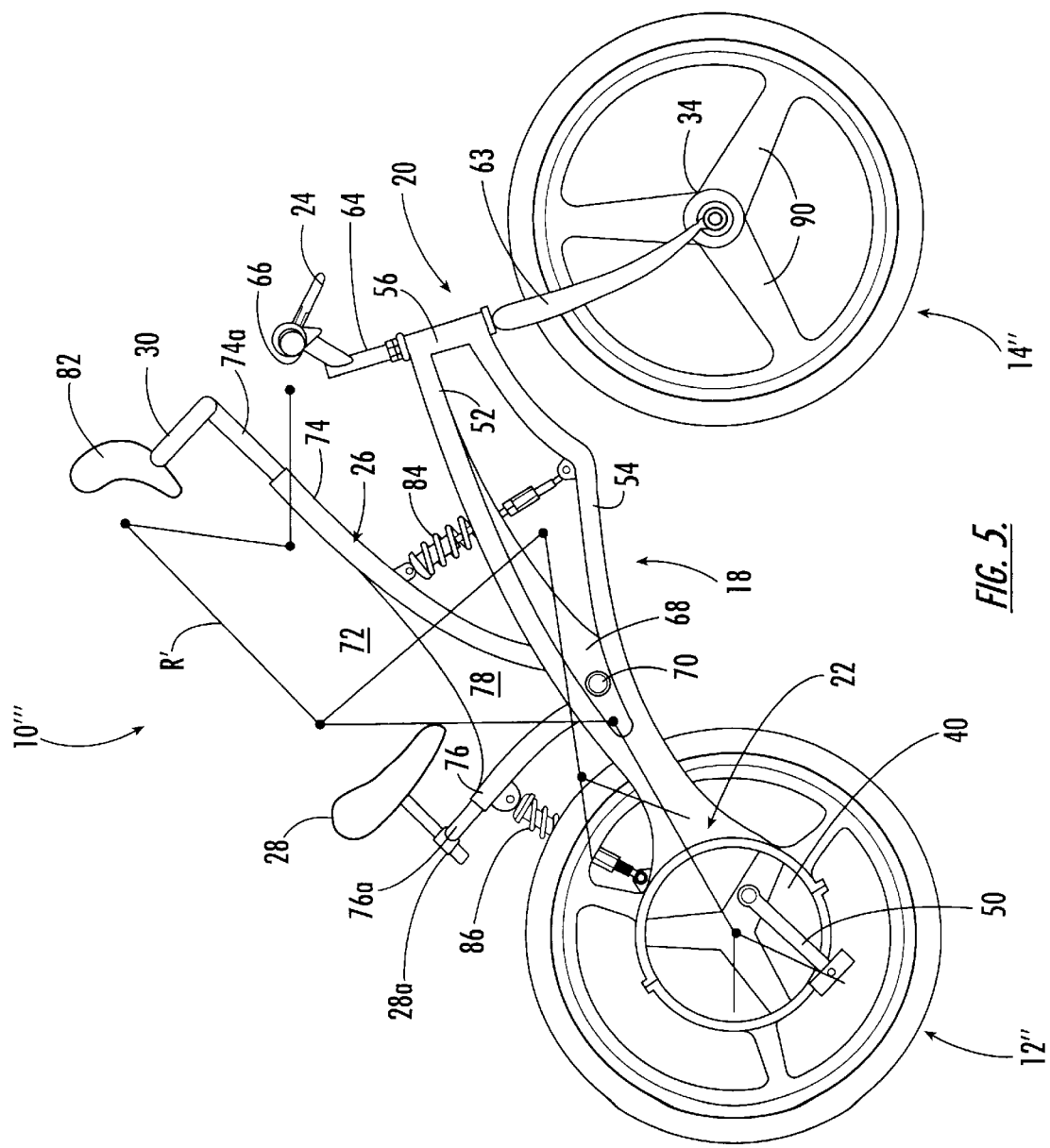
FIG. 5 is an enlarged right side elevation view of the bicycle shown in FIG. 4.

Referring now to FIGS. 4 and 5, there is illustrated another embodiment of a bicycle 10'" similar to the bicycle 10" shown in FIG. 3, except a 21-speed multispeed transmission 48 (FIGS. 6A and 6B) is contained in the hub 40 of the rear wheel. The pedal crank 50 is positioned in the hub offset from the center as shown in FIG. 4. The pedal crank 50 is mounted to the rear of where a seat is to be mounted on the body support member. The transmission 48 is coupled between the pedal crank 50 and the rear wheel. The 21-speed transmission 48 includes a pedal crank shaft that is fixed to a first large spool 96 of gears (FIG. 6A), which includes a chain drive 98 and transfer gear 100 that imparts power into another second spool 102 of gears having a transfer gear 103 and chain drive 103a (FIG. 6B). The 21-speed transmission 48 includes a planetary gear 104 and can be designed by one skilled in the art.

Referring back now to FIG. 1 and FIGS. 9 and 10, there is illustrated the embodiment where front and rear wheels are hubless. The front fork includes a roller bearing assembly 106 to engage the inside of the wheel rim 106a so that no hub or axle is needed. The rear wheel also includes a roller bearing assembly 108 to engage the inside of the wheel rim 108a to negate the necessity of having a central hub.

As illustrated, the body support member 26 is formed as a longitudinally extending, curvilinear shaped support tube member extending forward of the main frame, and also includes a slidable tube 26a for supporting the torso engaging member 30, formed as a shoulder rest. An upstanding seat support 110 is formed on the longitudinally extending support member adjacent the rear frame portion 22 and includes the seat mounted thereon. The front shock absorber 84 is mounted between the main frame 18 and longitudinally extending support member adjacent the front frame portion 20 and the rear shock absorber 86 is mounted between the upstanding seat support 110 and the continuous variable transmission 16. As illustrated, as in other embodiments, the pedal crank 50 is positioned to the rear of where the seat is positioned on the body support member. The continuous variable transmission can be designed in a manner known to those skilled in the art.

Figure 8:
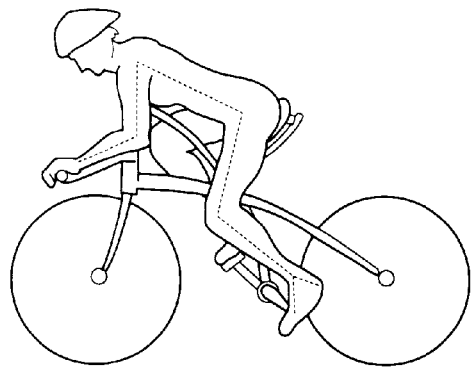
FIG. 8 is another schematic view of the bicycle of the present invention with a pedal crank positioned on a separate support member off the main frame.
Figure 10:
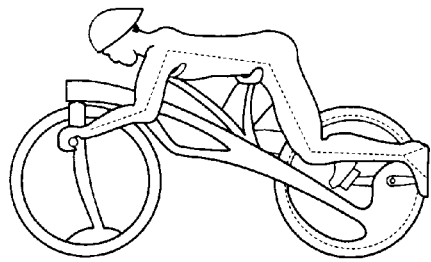
FIG. 10 is a schematic view of the bicycle of the present invention similar to FIG. 9 showing a rider positioned in a semi-prone position.

FIG. 7 shows a schematic illustration in profile of a rider positioned in a semi-prone position on a bicycle such as shown in FIG. 2. FIG. 8 shows a concept where the brake pedal could be located on a separate support member. FIG. 10 shows a schematic in profile of a rider on a bicycle as shown in FIG. 1.

It is evident that the present invention now provides a bicycle that allows a rider to be placed in a semi-prone riding position while providing not only support for the torso, including the front portion of the shoulders, but also allows the bicycle to absorb shocks without imparting shocks to the rider. This is provided by the advantageous design of having a body support member pivotally connected to the main frame and a separate seat and torso engaging member on the body support member and appropriate shock absorbing means pivotally connected between the main frame and body support member.

Other advantageous designs of the present invention include the position of the pedal crank to the rear of the seat and the use of the continuous variable transmission, or the multispeed gear assembly having a transfer gear assembly. The bicycle can be formed of a lightweight construction such as carbon fiber as known to those skilled in the art. The shock absorbers can be adjustable in length for varying the angle between the main frame and the body support member. Additionally, the slidable support tubes for mounting the seat and torso engaging member in the form of shoulder pads also allows the rider to select from a number of different seat and shoulder pad positions for comfort, speed and power.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A bicycle comprising:
   a main frame comprising front and rear frame portions;
   a handlebar and front wheel mounted on the front frame portion;
   a rear wheel mounted on the rear frame portion;
   a body support member forming a cradle having front and rear upstanding ends and pivotally connected to said main frame, said body support member further comprising a seat mounted on the rear upstanding end that supports a rider and a torso engaging member mounted on the front upstanding end for engaging the torso of a rider to place the rider in a substantially semi-prone riding position; and
   at least one shock absorbing means connected between an upstanding end of said body support member and said main frame for absorbing shocks and maintaining a rider in position.

2. A bicycle according to claim 1, wherein said shock absorbing means comprises a shock absorber having an adjustable length for varying the angle between the main frame and the body support member.

3. A bicycle according to claim 1, wherein aid shock absorbing means further comprises a front shock absorber mounted between said front frame portion and said body support member and a rear shock absorber mounted between said front frame portion and said body support member.

4. A bicycle according to claim 1, wherein said body engaging member comprises shoulder pads for engaging the front shoulders of a rider.

5. A bicycle according to claim 1, wherein said main frame comprises upper and lower frame members that merge at said rear frame portion.

6. A bicycle according to claim 1, wherein said body support member further comprises a longitudinally extending support member extending forward of the main frame, and an upstanding seat support on which the seat is positioned.

7. A bicycle according to claim 1, wherein said body support member further comprises a front slidable tube on which said torso engaging member is mounted for changing the position of the torso engaging member relative to said main frame.

8. A bicycle according to claim 1, wherein said bicycle further comprises a head tube having a support tube extending through the head tube and having upper and lower ends for supporting respectively said front wheel on the lower end of the support tube and said handlebar on the upper end.

9. A bicycle according to claim 8, wherein said front wheel comprises a hubless front wheel and said lower end of the support tube further comprises means for mounting said hubless front wheel.

10. A bicycle according to claim 8, wherein said front wheel comprises a front axle and wheel and the lower end of the support tube further comprises a front fork for supporting said front axle and wheel.

11. A bicycle according to claim 8, wherein said upper end of the support tube further comprises a handlebar support stem for supporting said handlebar.

12. A bicycle according to claim 11, wherein said handlebar support stem further comprises means for supporting said handlebar in a forward and downward direction from the handlebar support stem.

13. A bicycle according to claim 1, wherein said main frame further comprises pivotal mounting means for pivotally mounting said body support member adjacent the rear portion of said main frame.

14. A bicycle according to claim 1, wherein said rear wheel comprises a hubless wheel and said rear frame portion further comprises means for mounting a hubless wheel.

15. A bicycle according to claim 1, wherein said main frame and body support member are formed of carbon fiber.

16. A bicycle according to claim 1, wherein said rear frame portion of said main frame includes a pedal crank mounted to the rear of where the seat is mounted on said body support member.

17. A bicycle according to claim 1, wherein said rear portion of said main frame further comprises a transmission coupled between said pedal crank and said rear wheel.

18. A bicycle according to claim 17, wherein said transmission further comprises a continuous variable speed transmission.

19. A bicycle according to claim 17, wherein said transmission further comprises a multispeed transmission assembly having a transfer gear assembly.

20. A bicycle comprising:
   a main frame comprising a front and rear frame portions;
   a handlebar and front wheel mounted on the front frame portion;
   a rear wheel mounted on the rear frame portion;
   a body support member pivotally connected to said main frame, said body support member comprising a substantially U-shaped cradle having front and rear upstanding ends;
   a seat mounted on the rear upstanding end that supports a rider; and
   a torso engaging member mounted on the front upstanding end for engaging the torso of a rider and placing the rider in a substantially semi-prone riding position; and
   at least one shock absorbing means connected between an upstanding end of said body support member and said main frame for absorbing shocks and maintaining a rider in position.

21. A bicycle according to claim 20, wherein said shock absorbing means comprises a shock absorber having an adjustable length for varying the angle between the main frame and the body support member.

22. A bicycle according to claim 20, wherein said shock absorbing means further comprises a front shock absorber mounted between said front frame portion and said body support member and a rear shock absorber mounted between said front frame portion and said body support member.

23. A bicycle according to claim 20, wherein said body engaging member further comprising shoulder pads for engaging the front shoulders of a rider.

24. A bicycle according to claim 20, wherein said main frame comprises upper and lower frame members that merge at said rear frame portion.

25. A bicycle according to claim 20, wherein said body support member further comprises a longitudinally extending support member extending forward of the main frame, and an upstanding seat support on which the seat is positioned.

26. A bicycle according to claim 20, wherein said body support member further comprises a front slidable tube on which said torso engaging member is mounted for changing the position of the torso engaging member relative to the main frame.

27. A bicycle according to claim 20, wherein said front and rear upstanding ends of said U-shaped cradle further comprise slidable tubes for varying the position of said torso engaging member and said seat relative to the main frame.

28. A bicycle according to claim 20, wherein said bicycle further comprises a head tube having a support tube extending through the head tube and having upper and lower ends for supporting respectively said front wheel on the lower end of the support tube and said handlebar on the upper end.

29. A bicycle according to claim 28, wherein said front wheel comprises a hubless front wheel and said lower end of the support tube further comprises means for mounting said hubless front wheel.

30. A bicycle according to claim 28, wherein said front wheel comprises a front axle and wheel and the lower end of the support tube further comprises a front fork for supporting said front axle and wheel.

31. A bicycle according to claim 28, wherein said upper end of the support tube further comprises a handlebar support stem for supporting said handlebar.

32. A bicycle according to claim 31, wherein said handlebar support stem further comprises means for supporting said handlebar in a forward and downward direction from the handlebar support stem.

33. A bicycle according to claim 20, wherein said main frame further comprises pivotal mounting means for pivotally mounting said body support member adjacent the rear portion of said main frame.

34. A bicycle according to claim 20, wherein said rear wheel comprises a hubless wheel and said rear frame portion further comprises means for mounting said hubless wheel.

35. A bicycle according to claim 20, wherein said main frame and body support member is formed of carbon fiber.

36. A bicycle according to claim 20, wherein said rear frame portion of said main frame includes a pedal crank mounted to the rear of where the seat is mounted on said body support member.

37. A bicycle according to claim 36, wherein said rear portion of said main frame further comprises a transmission coupled between said pedal crank and said rear wheel.

38. A bicycle according to claim 37, wherein said transmission further comprises a continuous variable speed transmission.

39. A bicycle according to claim 37, wherein said transmission further comprises a multispeed transmission having a transfer gear assembly.

40. A bicycle comprising:
a main frame comprising front and rear frame portions;
a handlebar and front wheel mounted on the front frame portion;
a rear wheel mounted on the rear frame portion;
a body support member pivotally connected to said main frame, said body support member formed as a substantially U-shaped cradle having front and rear upstanding ends;
a seat mounted on the rear upstanding end that supports a rider;
a torso engaging member mounted on the front upstanding end for engaging the torso of a rider and placing the rider in a substantially semi-prone riding position; and
a front shock absorber mounted between said front frame portion and said body support member and a rear shock absorber mounted between said front frame portion and said body support member for absorbing ride shocks upon the torso and seat of a rider.

41. A bicycle according to claim 40, wherein said body engaging member further comprises a shoulder pad engaging the front shoulders of a rider.

42. A bicycle according to claim 40, wherein said main frame comprises upper and lower frame members that merge at said rear frame portion.

43. A bicycle according to claim 40, wherein said body support member further comprises a longitudinally extending support member extending forward of the main frame, and an upstanding seat support on which the seat is positioned.

44. A bicycle according to claim 40, wherein said body support member further comprises a front slidable tube on which said torso engaging member is mounted for changing the position of the torso engaging member relative to the main frame.

45. A bicycle according to claim 40, wherein said front and rear upstanding ends of said U-shaped cradle further comprise slidable tubes for changing the position of said torso engaging member and the seat relative to the main frame.

46. A bicycle according to claim 40, wherein said bicycle further comprises a head tube having a support tube extending through the head tube and having upper and lower ends for supporting respectively said front wheel on the lower end of the support tube and said handlebar on the upper end.

47. A bicycle according to claim 46, wherein said front wheel comprises a hubless front wheel and said lower end of the support tube further comprises means for mounting said hubless front wheel.

48. A bicycle according to claim 46, wherein said front wheel comprises a hubless front wheel and the lower end of the support tube further comprises a front fork for supporting a front axle and wheel.

49. A bicycle according to claim 40, wherein said upper end of the support tube further comprises a handlebar support stem for supporting said handlebar.

50. A bicycle according to claim 49, wherein said handlebar support stem further comprises means for supporting said handlebar in a forward and downward direction from the handlebar support stem.

51. A bicycle according to claim 40, wherein said main frame further comprises pivotal mounting means for pivotally mounting said body support member adjacent the rear portion of said main frame.

52. A bicycle according to claim 40, wherein said rear wheel comprises a hubless wheel and said rear frame portion further comprises means for mounting said hubless wheel.

53. A bicycle according to claim 40, wherein said main frame and body support member are formed of carbon fiber.

54. A bicycle according to claim 40, wherein said rear frame portion of said main frame further comprises means for receiving a pedal crank to the rear of where a seat is to be mounted on said body support member.

55. A bicycle according to claim 40, wherein said rear portion of said main frame further comprises a transmission coupled between said pedal crank and said rear wheel.

56. A bicycle according to claim 55, wherein said transmission further comprises a continuous variable speed transmission.

57. A bicycle according to claim 55, wherein said transmission further comprises a multispeed transmission having a transfer gear assembly.

58. A bicycle comprising:
- a main frame comprising a front and rear frame portions, and upper and lower frame members that merge at a rear frame portion;
- a handlebar and front wheel mounted on the front frame portion;
- a rear wheel mounted on the rear frame portion;
- a body support member pivotally connected to said main frame, said body support member further comprising a seat that supports a rider, and a torso engaging member for engaging the torso of a rider to place the rider in a substantially prone riding position;
- a pedal crank mounted on the rear portion of the main frame at a position to the rear of where the seat is mounted on the body support member; and
- a transmission coupled between the pedal crank and the rear wheel.

59. A bicycle according to claim 58, and further comprising shock absorbing means pivotally connected between said main frame and body support member for supporting the body support member and absorbing shocks upon the torso and seat of a rider.

60. A bicycle according to claim 59, wherein aid shock absorbing means further comprises a front shock absorber mounted between said front frame portion and said body support member and a rear shock absorber mounted between said front frame portion and said body support member.

61. A bicycle according to claim 59, wherein said shock absorbing means comprises a shock absorber having an adjustable length for varying the angle between the main frame and the body support member.

62. A bicycle according to claim 58, wherein said body engaging member further comprises pads for engaging the front shoulders of a rider.

63. A bicycle according to claim 58, wherein said body support member comprises a substantially U-shaped cradle having a lower end pivotally connected to the frame, and front and rear upstanding ends for respectively mounting the torso engaging member and the seat.

64. A bicycle according to claim 63, wherein said front and rear upstanding ends of said U-shaped cradle further comprise slidable tubes for changing the position of said torso engaging member and the seat relative to the main frame.

65. A bicycle according to claim 58, wherein said rear frame portion of said main frame further comprises a pedal crank mounted to the rear of where the seat is mounted on said body support member.

66. A bicycle according to claim 58, wherein said rear portion of said main frame further comprises a transmission coupled between the pedal crank and the rear wheel.

67. A bicycle according to claim 66, wherein said transmission further comprises a continuous variable speed transmission.

68. A bicycle according to claim 66, wherein said transmission further comprises a multispeed transmission having a transfer gear assembly.

69. A bicycle frame assembly comprising:
- a main frame comprising a front frame portion for receiving a handlebar and front wheel assembly, and a rear frame portion for receiving a rear wheel;
- a body support member pivotally connected to said main frame, said body support member further comprising a seat that supports a rider, and a torso engaging member for engaging the torso of a rider; and
- a front shock absorber mounted between said front frame portion and said body support member and a rear shock absorber mounted between said rear frame portion and said body support member.

70. A frame assembly according to claim 69, wherein said body engaging member is configured for engaging the front shoulders of a rider.

71. A frame assembly according to claim 69, wherein said body support member comprises a substantially U-shaped cradle having a lower end pivotally connected to the frame, and front and rear upstanding ends for respectively mounting the torso engaging member and the seat.

72. A frame assembly according to claim 71, wherein said front and rear upstanding ends of said U-shaped cradle further comprise slidable tubes for changing the position of said torso engaging member and the seat relative to the main frame.

73. A frame assembly according to claim 69, wherein said rear frame portion of said main frame further comprises a pedal crank mounted to the rear of where the seat is mounted on said body support member.

74. A frame assembly according to claim 69, wherein said rear portion of said main frame further comprises a transmission coupled between the pedal crank and rear wheel.

75. A frame assembly according to claim 74, wherein said transmission further comprises a continuous variable speed transmission.

76. A frame assembly according to claim 74, wherein said transmission further comprises a multispeed transmission having a transfer gear assembly.

* * * * *